United States Patent
Anders et al.

(10) Patent No.: US 6,996,599 B1
(45) Date of Patent: Feb. 7, 2006

(54) SYSTEM AND METHOD PROVIDING MULTI-TIER APPLICATIONS ARCHITECTURE

(75) Inventors: Mark T. Anders, Bellevue, WA (US); Gary S. Burd, Kirkland, WA (US); Scott D. Guthrie, Bellevue, WA (US); Satoshi Nakajima, Redmond, WA (US); Erik B. Olson, Redmond, WA (US); Dmitry Robsman, Bellevue, WA (US); John P. Shewchuk, Redmond, WA (US); Michael J. Toutonghi, Seattle, WA (US); Manu Vasandani, Bellevue, WA (US)

(73) Assignee: Microsoft Corporation, Sunnyvale, CA (US)

( * ) Notice: Subject to any disclaimer, the term of this patent is extended or adjusted under 35 U.S.C. 154(b) by 405 days.

(21) Appl. No.: 09/666,246

(22) Filed: Sep. 21, 2000

Related U.S. Application Data (60) Provisional application No. 60/213,188, filed on Jun. 21, 2000.

(51) Int. Cl.
*G06F 15/16* (2006.01)
(52) U.S. Cl. .................... 709/201; 709/203; 709/219
(58) Field of Classification Search ........ 709/201–203, 709/217–219, 229–232
See application file for complete search history.

(56) References Cited

U.S. PATENT DOCUMENTS

| | | | |
|---|---|---|---|
| 5,774,668 A * | 6/1998 | Choquier et al. ........... 709/223 |
| 5,845,084 A * | 12/1998 | Cordell et al. .............. 709/234 |
| 5,961,601 A | 10/1999 | Iyengar ....................... 709/229 |
| 6,014,702 A | 1/2000 | King et al. .................. 709/227 |
| 6,112,228 A | 8/2000 | Earl et al. ................... 709/205 |
| 6,125,388 A * | 9/2000 | Reisman ...................... 709/218 |
| 6,175,918 B1 * | 1/2001 | Shimizu ......................... 713/1 |
| 6,192,394 B1 * | 2/2001 | Gutfreund et al. .......... 709/204 |
| 6,321,263 B1 * | 11/2001 | Luzzi et al. ................ 709/224 |
| 6,327,658 B1 * | 12/2001 | Susaki et al. ............... 713/176 |
| 6,370,570 B1 * | 4/2002 | Muir et al. ................. 709/217 |
| 6,446,113 B1 * | 9/2002 | Ozzie et al. ................ 709/204 |
| 6,507,867 B1 * | 1/2003 | Holland et al. ............. 709/219 |
| 6,687,745 B1 * | 2/2004 | Franco et al. ............... 709/219 |
| 2002/0103884 A1 * | 8/2002 | Duursma et al. ........... 709/219 |
| 2002/0124082 A1 * | 9/2002 | San Andres et al. ........ 709/225 |
| 2003/0074393 A1 * | 4/2003 | Peart .......................... 709/203 |

OTHER PUBLICATIONS

Kroger, R., et al.; "Automated CORBA-based application management", *Distributed Applications and Interoperable System II. IFIP TC6 WG6.1 Second International Working Conference on Distributed Applications and Interoperable Systems*, 1999, p. 229-241.

(Continued)

*Primary Examiner*—Glenton B. Burgess
*Assistant Examiner*—Yasin Barqadle
(74) *Attorney, Agent, or Firm*—Amin & Turocy, LLP (57) ABSTRACT

A network-based distributed application system is provided in accordance with the present invention for enabling services to be established locally on a client system. The system may include an application and presentation logic, at least a portion of which is interchangeably processed by a server or a client without modification to the portion. The core functionality provided by the application may be preserved between the client and the server wherein improved network performance may provided along with improved offline service capabilities.

24 Claims, 6 Drawing Sheets

OTHER PUBLICATIONS

Gerodolle, A., et al.; "A Middleware Approach to Building Large-Scale Open Shared Virtual Worlds", Proceedings 33rd International Conference on Technology of Object-Oriented Languages and Systems TOOLS 33, 2000, p. 169-180.

*Lesson: Overview of Servlets,* http://java.sun.com/docs/books/tutorial/servlets/overview/index.html, Viewed Apr. 3, 2001, p. 1-2.

*Lesson: The Servlet Life Cycle,* http://java.sun.com/docs/books/tutorial/servlets/lifecycle/index.html, Viewed Apr. 3, 2001, p. 1-2.

Bettini, L., et al., "*A Java 2 Network Class Loader*", *Dr. Dobb's Journal,* vol. 26, No. 2, Feb. 2001, p. 58, 60, 62, 64.

Tsaoussidis, V., et al., "A CORBA-based Application Service Middleware Architecture and Implementation" 1999, p. 1-7.

"Phomozilla: Pipes, Protocols, and P2P in Mozilla", can be found at http://protozilla.mozdev.org/white-paper.html, last accessed May 25, 2005, 2 pages.

* cited by examiner

SYSTEM AND METHOD PROVIDING MULTI-TIER APPLICATIONS ARCHITECTURE

REFERENCE TO RELATED APPLICATION

This application claims the benefit of U.S. Provisional Patent Application Ser. No. 60/213,188 which was filed Jun. 21, 2000, entitled SYSTEM AND METHOD PROVIDING MULTI-TIER APPLICATIONS ARCHITECTURE.

TECHNICAL FIELD

The present invention relates generally to computer systems, and more particularly to a system and method for providing a multi-tier distributed applications architecture wherein portions of remote applications may be executed from local systems to facilitate higher performance network/system operations and provide consistent offline/online user experiences.

BACKGROUND OF THE INVENTION

The explosion of Internet and other network technologies has fueled a technology revolution for the latter portions of the twentieth century and beyond. With these new and exciting technologies, companies—new and old, have been thriving and to some extent forced by circumstances to accept existing systems and network architectures which have evolved over time and continue to provide existing services. For example, a common theme among Internet systems is to provide very powerful servers tightly coupled to large databases wherein the server may process thousands of requests from remote users surfing the world-wide web via server provided applications. While this model may continue to serve Internet traffic, performance and logistical problems remain unsolved by the present system.

One such problem associated with the server provided applications model relates to leveraging of local client resources. For example, network servers tend to act as a bottleneck since they must perform a plurality of redundant computations in order to respond to a plurality of variable remote service requests. As Personal Computer (PC) performance has increased because of more powerful microprocessors and clock speeds, overall network performance has lagged these increases because bottlenecks created at the server end many times cause PC's to wait for remote processing to complete. Thus, increases in current PC technology have not been fully leveraged/utilized by the current model.

Another problem related to the server provided applications model is associated with network performance in general. Web page accessing and manipulations, for example, generally require large amounts of data to continually be exchanged between remote clients and servers. As the number of users increase, data transactions on the Internet increase thereby causing overall communications performance to decrease. Therefore, a more powerful and flexible systems architecture is needed wherein clients may continue to enjoy network interactivity, yet, reduce network requests and latency associated therewith.

Still yet another problem associated with existing architectures is related to offline performance of network-based systems. Many Web pages, for example, provide an interactive and vibrant experience for users to observe and utilize data provided from a given site. As long as users remain online with the present site, the interactive experience continues. Unfortunately, even though data files may be downloaded from these sites, the interactive and often times useful presentation/manipulation of the data is lost when disconnecting from the server applications operating the web page. As users go offline to observe the data at a later time, it would be highly relevant and useful to be able to view and manipulate the data as if online with the associated server. Consequently, there is an unsolved need for a system and/or methodology to provide offline service capabilities similar to those which may currently be obtained online.

SUMMARY OF THE INVENTION

The present invention relates to a multi-tier applications architecture wherein applications may be shared and leveraged across a plurality of systems. The multi-tier architecture enables local systems resources to service applications that were conventionally provided at centrally located application server systems. Thus, performance and offline capabilities are facilitated by the present invention since client personal computer systems may contribute and service network applications (e.g., Internet, Intranet, Wireless Networks, Telecommunications) locally as opposed to services being provided and thus communicated from central locations. By shifting performance capabilities from server systems to client systems, network performance may be improved and latencies associated with remote service requests mitigated. Furthermore, offline capabilities may be improved.

More specifically, the present invention provides a multi-tier architecture wherein interactive processing associated with remote data systems may be performed locally. The architecture may include a presentation tier, a mobile tier (e.g., unguarded tier), a guarded tier, and a data tier. The presentation tier may include a browser for generating remote user data requests, for example. The browser may then generate a local request to the mobile tier resident on a client machine, for example. Local application logic associated with the mobile tier may then send remote service requests to a guarded tier associated with a remote server having access to the data tier. Upon receiving the remote request, the guarded tier may download portions of applications logic to the mobile tier along with associated data from the data tier for interacting and manipulating remote data associated with a web page and/or other network application. It is noted that the applications portions described above may be alternatively loaded on the client end from a CD ROM, for example. Upon installing the applications in the mobile tier, the client system may thus interact with the remote data locally and thus leverage local computing resources and further mitigate network accesses to the server system. Moreover, a unified applications model is provided wherein client resources are more fully utilized, security is improved, installation costs are reduced, and round trip latencies associated with conventional server models improved. As will be described in more detail below, local accesses may be facilitated by providing a request handling system wherein local system accesses may be directed to local resources and remote accesses directed to remote locations—transparently from the user. By enabling applications to execute locally, users may interact with network data offline in a similar manner to their online experience. Thus, the present invention provides an improved offline user experience.

One specific aspect of the present invention relates to a network-based application, comprising: application and presentation logic, at least a portion of which is interchangeably processed by a server or a client without modification to the portion.

Another aspect of the invention relates to an architecture for processing network-based applications. The architecture includes a presentation tier for interacting with a web-based application at a client. A mobile tier is operatively coupled to the presentation tier, the mobile tier providing for executing at least a portion of the network-based application at either the client end or a server. A guarded tier is operatively coupled to at least one of the mobile tier and presentation tier, the guarded tier providing for executing remaining portions of the web-based application at the server.

Another aspect of the invention relates to a method for executing a network-based application, comprising: executing at least a portion of a network-based application on the client computer, the web-based application comprising application and presentation logic, at least a portion of which is interchangeably processed by a server or the client without modification to the portion.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention is now described with reference to the drawings, wherein like reference numerals are used to refer to like elements throughout.

The present invention relates to a system and methodology for executing network server applications on a client machine (e.g., inside a browser) without the need for a network server to be installed locally on the machine. Applications may thus be downloaded and installed automatically thereby facilitating a zero-cost installation and execution in a secure environment. The present invention enables network applications that look similar and/or identical to network applications written for network servers. Furthermore, these applications may run offline and without the hardware requirements generally associated with a host network server.

Figure 1A:
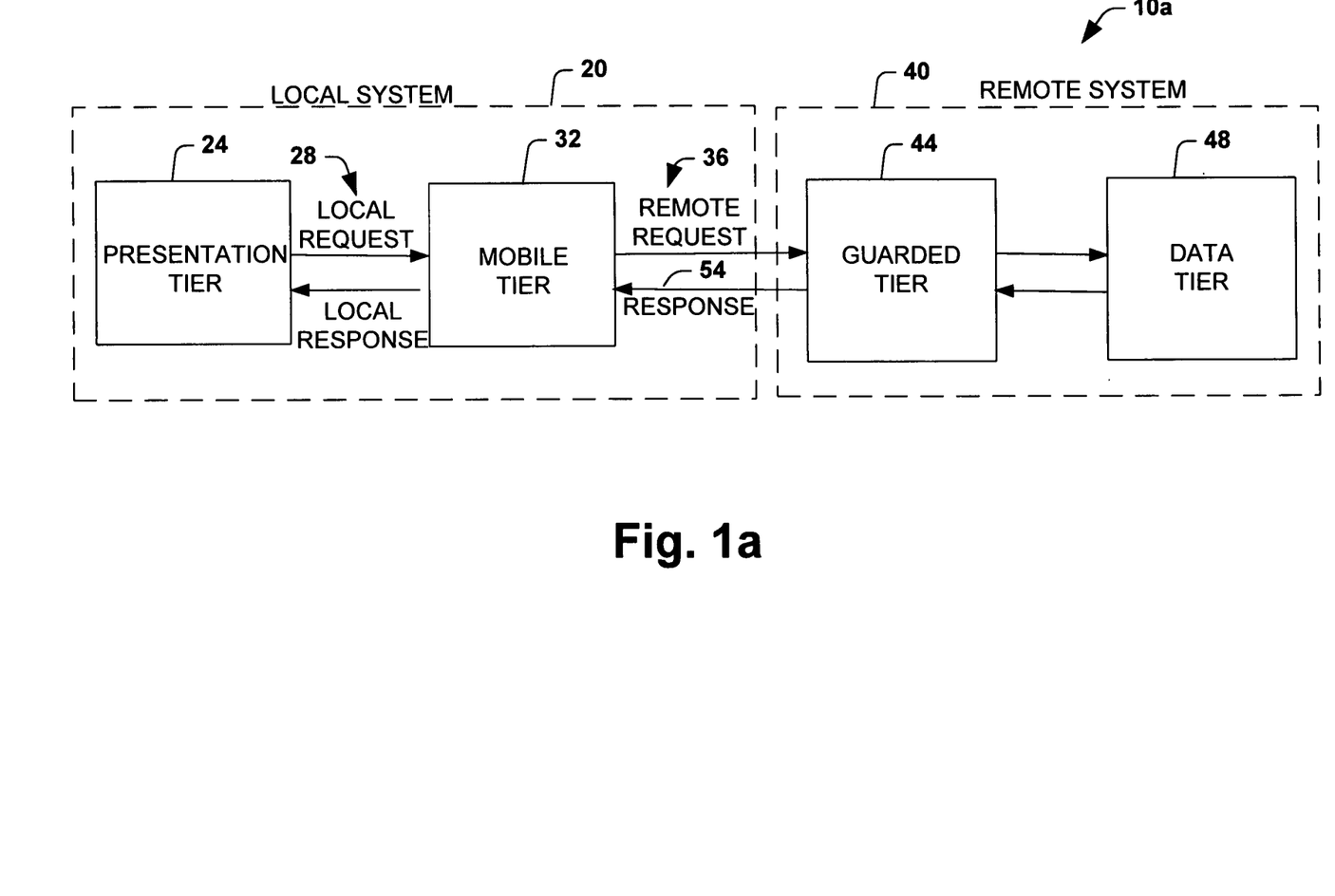
FIG. 1a is a schematic block diagram illustrating a multi-tier architecture in accordance with an aspect of the present invention.

Referring initially to FIG. 1a, an exemplary system 10a illustrates an aspect of a multi-tier distributed applications architecture in accordance with the present invention. A local system 20 is provided for handling local system requests and local data handling (e.g., Web page, wireless data) operations. A presentation tier 24 which may include a browser (not shown) (e.g., Internet Explorer, Netscape, HTML 3.2, WML, JAVA) provides an interface for users to access local (e.g., Web) information on the local system 20. As users access the presentation tier 24, local data requests 28 (e.g., HTTP) are sent to a mobile tier 32. The mobile tier 32 provides local application logic (not shown) for translating and directing local requests 28 for processing at the local system 20 and/or sending remote requests 36 (e.g., HTTP) to a remote system 40. It is noted that the mobile tier 32 may generally be considered as "unguarded logic" except, for example, in systems wherein a high degree of trust may be established between the remote system 40 and the local system 20. The remote system 40 may include a guarded tier 44 for providing the local applications logic to the mobile tier 32 and/or for providing an interface to data relating to information (e.g., Web pages, remote application data) associated with a data tier 48. By enabling applications logic and data associated with the data tier to be downloaded from the guarded tier 44, local system 20 resources may be leveraged to facilitate information access and to enable information provided by the data tier 48 to be manipulated and utilized off line by the local system 20. It is noted that the application logic in the mobile tier 32 may alternatively be provided locally by loading from a CD and/or floppy disk, for example, on the local system 20.

As local requests 28 are generated for accessing and operating on local data, the mobile tier 32 determines if application logic for servicing the local requests 28 is resident on the local system 20. If the applications logic is not resident, the mobile tier 32 may initiate a download request via the remote request 36 to the guarded tier to have the application logic sent from the remote system 40. Upon receiving the logic, the mobile tier 32 may also receive data from the data tier 48 for servicing local data requests 28. After the mobile tier 32 has been configured to service local requests 28, the user may then access information, for example, as if provided at the remote system 40. However, local system 20 resources may now be utilized to service the requests. In this manner, improved performance and offline manipulations of information (e.g., Web page) may thus be achieved. If a local request 28 requires further data for operation, additional remote requests 36 may be initiated to the guarded tier 44, and/or initiated at a later time when the user reestablishes an online connection after having worked offline.

Figure 1B:
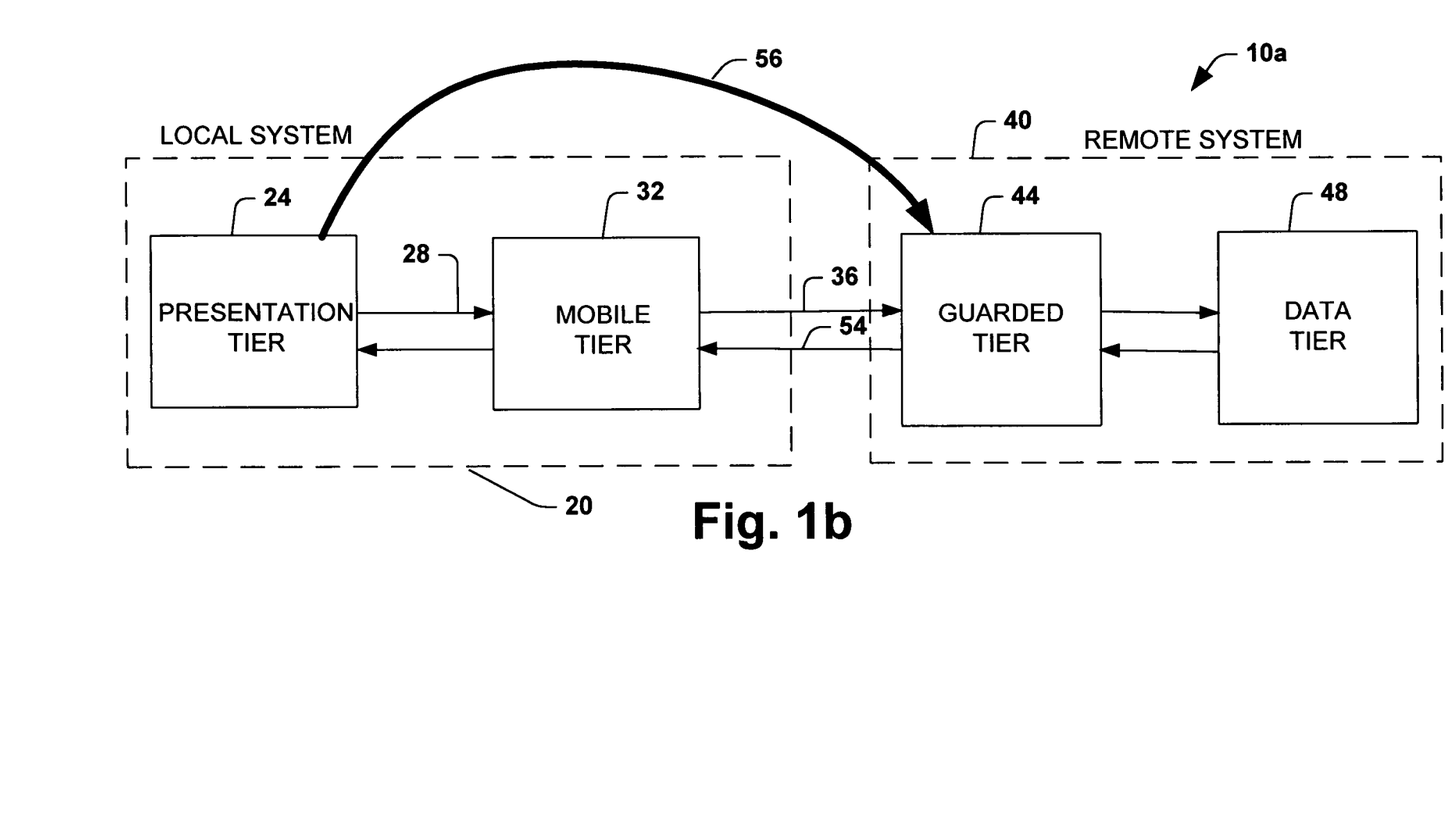
FIG. 1b is a schematic block diagram illustrating a multi-tier architecture in accordance with another aspect of the present invention.

It is noted that the guarded tier 44 may provide the applications logic and data described above via a remote response 54 (e.g., XML file, Wireless Markup Language (WML) file). It is further noted that the mobile tier 32 logic may reside on either the guarded tier 44 or mobile tier 32. For example, the guarded tier 44 may include portions of an interface (not shown) to respond to mobile tier 32 download requests in accordance with the present invention, and may include logic for servicing requests from the presentation tier 24 directly. Referring briefly to FIG. 1b, a bypass request 56 may be initiated by the presentation tier 24 to access remote systems directly if a guarded tier configured in accordance with the present invention is not provided by the remote system 40.

Referring back to FIG. 1*a*, after the local system 20 has been configured (e.g., download and/or CD installation) an offline system in accordance with the present invention may be utilized. For example, an application may be downloaded from an Internet shopping site. The application may provide a portion of its data catalog in XML format for offline viewing from the data tier 48 described above. The Internet shopping site may advertise on its entry page, for example, that users can browse their inventory and place orders while offline by clicking on a link. The shopping application and an XML data catalog may then be downloaded and automatically installed locally. Throughout the week, the customer browses the catalog locally and adds items to their shopping cart whenever they remember they need something. When the order is submitted, a queued transaction may be generated in an XML store maintained in the application's storage (not shown). The next time the user is online, they may navigate to the shopping application, which notifies them that they have orders to submit. The user may then authorize the submission of the order, which is then processed. The user may also receive notification of any price changes (sales or cost increases), and then may authorize or reject the order wherein an estimated delivery time may be returned.

It is to be appreciated that although an Internet application example has been described above, that the present invention may apply to substantially any local and remote system configured in accordance with the present invention. For example, a wireless telephone, Personal Digital Assistant (PDA), or other handheld device may be configured to load mobile tier logic in accordance with the present invention from a remote server location. For example, a wireless phone user may download applications logic and data relating to a phone directory from a remote system. At some later time for example, the user may access and manipulate the directory as if the user were still connected via a direct wireless connection to the remote system. If additional data were required from the remote system, the mobile tier logic may request the additional data the next time the user accesses the remote system or initiate a wireless connection to the remote system based upon the request. It is to be further appreciated that a plurality of other local/remote systems may be similarly configured.

As will be described in more detail below, a security system may be included within the mobile tier 32 to protect local files within the local system 20 from undesired accesses. It is also noted that the remote system 40 may include a tightly coupled relationship between the guarded tier 44 and the data tier 48 wherein the guarded tier logic for accessing the data tier may be highly dependent on the data tier 48. In contrast, the present invention provides a loosely coupled relationship between the local system 20 and the remote system 40 wherein data may be accessed infrequently and at the behest of local system requirements thereby facilitating maximum flexibility and performance between the systems. It is further noted that a tightly and/or loosely coupled arrangement may be established between the presentation tier 24 and the mobile tier 32.

Figure 2:
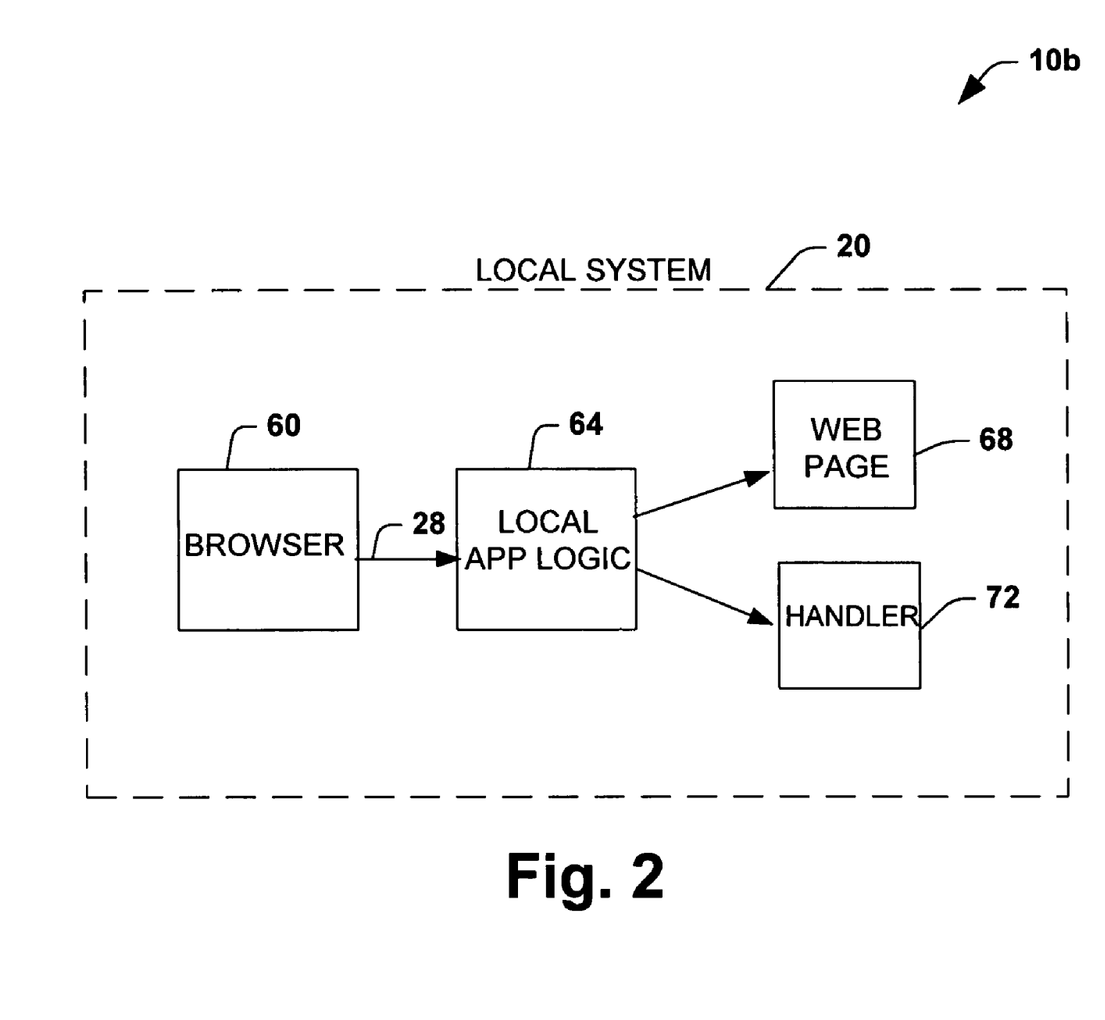
FIG. 2 is a schematic block diagram illustrating a local applications environment in accordance with an aspect of the present invention.

Referring now to FIG. 2, a system 10*b* illustrates a local system 20 architecture in accordance with an exemplary aspect of the present invention. Although the system 10*b* is described in relation to an Internet example, it is to be appreciated that the present invention may be applied to substantially any local/remote data access system as described above. For example, the local system 20 may include a browser 60 for providing a user interface for communicating to local applications logic 64 to access Web pages 68 and or other data formats. The Web pages 68 may include HTML headers and scripts for operating the Web page, for example. A handler 72 (e.g., HTTP) may also be provided for processing local requests 28. As will be described in more detail below, local requests may be mapped to the local system upon loading of the local application logic 64. For example, a remote Internet request may appear as: http:www.example.com wherein the present invention may map the remote request to MyCompany: www.example.com for local Web page access upon loading of the logic 64. Thus, a user is provided with a seamless and transparent system for processing Web page and/or other requests on the local system 20.

Figure 3:
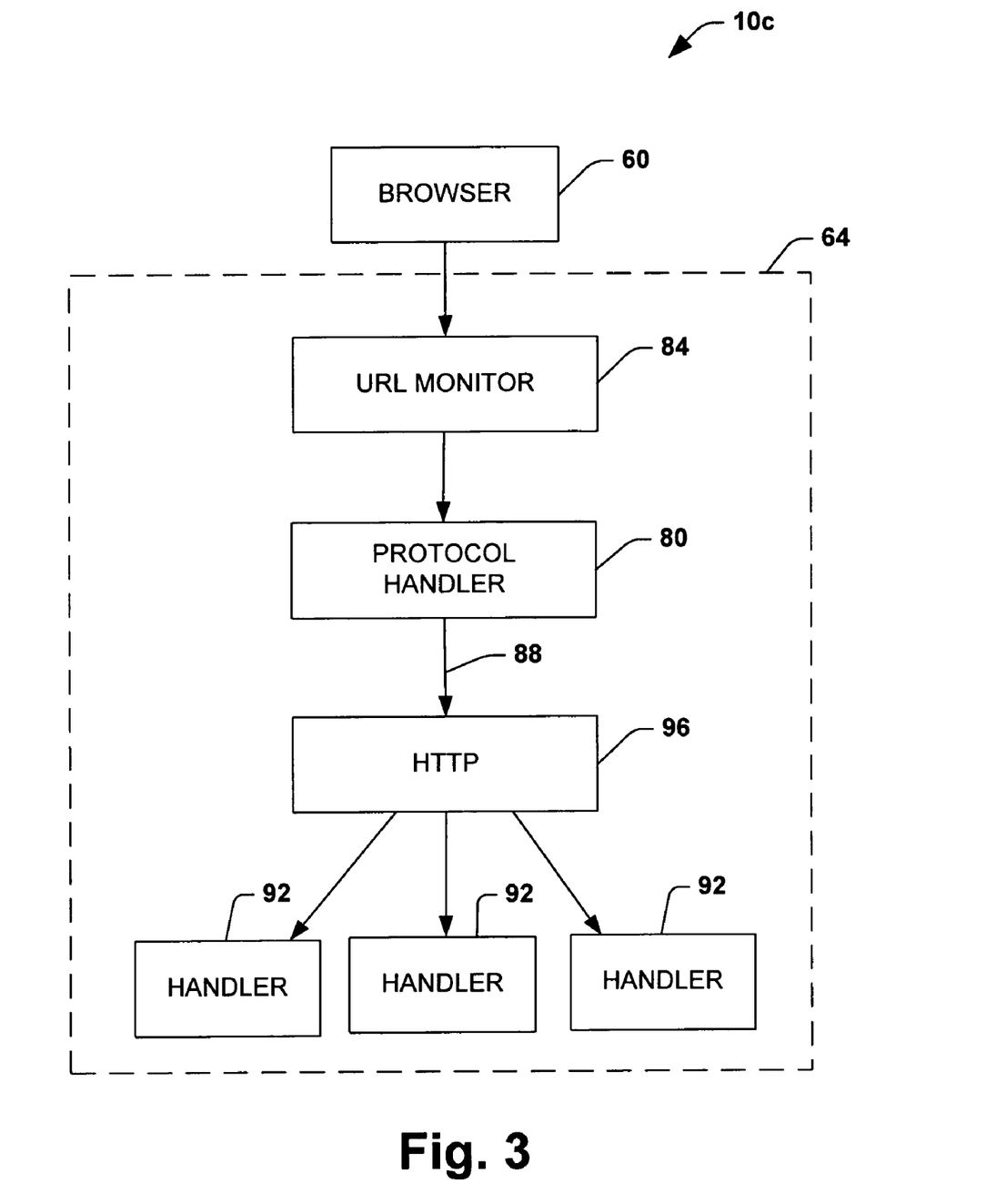
FIG. 3 is a schematic block diagram illustrating a request handling system in accordance with an aspect of the present invention.

Referring now to FIG. 3, a system 10*c* illustrates a request handling system in accordance with an aspect of the present invention. The system 10*c* may be adapted to execute in conjunction or within the browser 60. The system 10*c* utilizes an asynchronous pluggable protocol handler (APP) 80 that may be registered as the handler for the protocol scheme described below. When requests are generated by the browser 60 employing the protocol scheme, a URL Monitor 84 activates the handler (APP) 80. The APP 80 hands the request off to a worker request 88 written for the system 10*c*, which maps the URI (Universal Resource Identifier) to a local handler 92 (static files may also be directed through this mechanism) adapted to process local HTTP requests 96. The APP 80 provides the browser 60 with a suitable security zone for the given application based on information from the local registry (not shown).

The protocol scheme described above will now be described in more detail. The system 10*c* may employ the protocol scheme to identify all URI's including both dynamic and static content. For example, a Web site application may present the following URI's that are all resolved to local handlers 92 (the mapping mechanism is described in more detail below) wherein expampleweb provides an exemplary mapping to local resources.

exampleweb://www.microsoft.com/money/default.aspx
exampleweb://www.microsoft.com/money/images/logo.jpg
exampleweb://www.microsoft.com/money/accounts.aspx
exampleweb://www.microsoft.com/money/static/about.htm The system 10*c* may maintain a local mapping of installed applications and their URI namespaces to local storage locations. This enables users to refer to remote applications employing their remote URI for example. This also enables URI's to be exportable in some manner to other installations and enables demand-driven installation of applications adapted to operate with the present invention. Additionally, browser applications may be alerted that these applications, which may be installed locally, originate remotely and therefore should run with trust suitable to the remote site, rather than the local machine.

For example, consider a user installing a future version of Microsoft Money employing the URI exampleweb://www-.microsoft.com/money. The first attempt to invoke the URI may result in the system 10*c* retrieving a manifest (described below) utilizing its naming pattern from the site (e.g., http://www microsoft.com/money/exampleweb.osd). If the user chooses to install the application, the data may be copied locally and installed. When the user later returns to the application URI (exampleweb://www.microsoft.com/money), the system 10*c* may invoke the locally installed version of the application. When the application is local however, the browser 60 should be alerted that it's a remote application so that the browser does not access local resources doing cross frame attacks in the browser, for example. This mechanism also enables the user to know what they're running and where files originated.

When resolving names, the system 10c may iterate over a list (not shown) of local mappings looking for the longest match, for example. After choosing the longest match, the system may resolve the match to the application domain of the installed application and call an appropriate handler 92. In the case of shadowing, wherein the user has installed an application from a given point and later wants to install an application from a point deeper in the same hierarchy (e.g., exampleweb://www.microsoft.com/money/addons/loan-calculator), demand-installation may still be a possibility because there may be no handler 92 registered for the URI.

The following example illustrates an aspect of how URI mapping may operate in the system 10c. A user may have two applications installed as follows:

| Application | Application URI | Local Install Point |
|---|---|---|
| Money | exampleweb://www.microsoft.com/money | c:\money |
| OfflineGrocer | exampleweb://www.offlinegrocer.com | c:\program files\www.offlinegrocer.com |

Each of these applications may have a hierarchy under its root consisting of Web pages, COM+ assemblies in a bin directory, static content, and data, for example. Applications may have an arbitrary structure, but for this example, these applications may have the following exemplary structure:
approot
  bin\ # Business logic (various assemblies)
  img\ # images
  data\ # XML stores
  default.aspx
  config.cfg The following tables demonstrates various exemplary application URI's and the physical file that they correspond to. It is to be appreciated that applications may also maintain virtual URI's by associating requests for part of their URI namespace to a given handler 92.

| URI | Physical Path |
|---|---|
| exampleweb://www.microsoft.com/money/ | c:\money\default.aspx |
| exampleweb://www.microsoft.com/money/img/dollar.jpg | c:\money\img\dollar.jpg |
| exampleweb://www.offlinegrocer.com | c:\program files\www.offlinegrocer.com\default.aspx |
| exampleweb://www.offlinegrocer.com/order.aspx | c:\program files\www.offlinegrocer.com\order.aspx |

There may be at least two ways to install applications: Utilizing a standard installation platform to install the application or demand-driven installation wherein a remote URI is requested using the protocol scheme described above. Installed applications may be maintained in a local registry (not shown) that maps URI's to their installed location. The registry may also maintain installation information including the time of installation and usage information. The information for applications may be stored in the system registry under HKEY_CURRENT_USER\\SOFTWARE\Microsoft\XSP\Exampleweb, for example. For each application, there may be a key named with their origin host and application path. (e.g., www.foo.com/myapp). For installed applications, the following registry values may be included:

| Name | Value | Value Type | Description |
|---|---|---|---|
| AppCreationDate | REG | QWORD | The system time at which the application was installed |
| AppDirectory | REG | QWORD | The local file directory where the application is located |
| AppDomain | REG | SZ | The application domain ID (autogenerated as a GUID) |
| AppLastAccessDate | REG | SZ | The last time the application was accessed. This defaults to the installation time until another access is made to the application. |

Installation for explicit and/or demand-driven scenarios may consist of retrieving a cabinet (CAB) file or explicit file specified in the manifest (described below) along with any dependencies. When files have been retrieved, files may be placed into a directory in the file system (CAB files may be exploded preserving their directory hierarchies). An entry may be added to the registry thus mapping the application URI to its physical location. The physical location may be determined on a unique identifier (such as a GUID not shown). This is desired so the name may not be easily computed.

Applications may be placed in the file system employing the following naming convention. Starting from a base application directory (e.g., c:\program files), and append the server name, then the application name, and then a uniquely generated identifier. As an example, an application originating from http://www.foo.com/bar/baz might reside in a directory entitled:

c: \program files\exampleweb\www.foo.com\bar\baz\
    {00000019-000-0010-800000AF00ED2EA4}

The random part of the name should be unpredictable and generated by the system 10c prior to installing the application. Applications may consist of any suitable Web page handler including pages, messaging/web, method files, handlers, and configuration data. The configuration data may activate handlers for the application scope and provide settings for the application.

When the user tries to navigate to a URI that is not installed locally, either because of clicking on a link or by typing in the URI in the browser 60, the system 10c may try to locate the application manifest, described below. If the presented URI identifies the application manifest as determined by the extension, the system may retrieve it and parse the manifest file. The user may then be presented with a User Interface UI (not shown) that indicates the system 10c is attempting to install applications locally. For example, the UI may show required disk space (based on the sum of <DISKSPACE> OSD element, if present, and the size required to store any dependent CAB files) and enable users to override a default disk quota and browse file names contained in the application—if desired. The installation UI may provide both a default view of basic configuration data and an advanced view that shows individual files and enables users to control application execution permissions (e.g., enable file I/O permissions and/or classic COM interoperability).

It is noted that installations may not require configurations initially, although configurations may be provided if desired.

To enable transparent operation, the user should click to confirm the installation and proceed utilizing default values. If the URI did not refer to the manifest file directly, the system 10c may attempt to retrieve the manifest by combining the canonical manifest name with the host/path portion of the URI. If that fails, the system may employ a back-off algorithm consisting of removing portions of the path and thus locating the manifest file at each level. For packaged installations (e.g., CD ROM, floppy), applications may call registry API's to register appropriately. By default, these applications may be given local trust. However, these applications may safeguard themselves employing COM+ code access security, for example, to request permissions that they may require.

The UI described above may include options to automatically update applications that are found to be out of date or the user may select to manually confirm updates on any applications that are found to be out of date. When the system checks for an application update, it may first retrieve the manifest file. If the manifest file has a different version, the system may retrieve and install the various dependencies pending user confirmation. As is with installation, the system may restrict download updates from the application's origin server as a safeguard. Additionally, an Isolated Storage feature may be provided by COM+, for example, to enable installed applications to maintain durable storage locally. Isolated Storage provides a managed file system that supports isolation via a plurality of mechanisms, expiration, and lifetime management. This is a feature of the COM+ for system 10c applications since applications maintain isolated data storage without exposing the user to risks of having the application access the local file system.

The system 10c supports installing applications employing the manifest (e.g., OSD) described above. The default manifest name may be exampleweb.osd, for example. OSD manifests support an implementation tag that enables the manifest to define varying representations of a software resource. For example, there might be a both native Win32 version and a system 10c version. The type of implementation may be denoted by an IMPLTYPE element. For example, the system may install applications that have an IMPLTYPE of "Com+", "Exampleweb" or those that have one or fewer implementation elements that lack an explicit IMPLTYPE element. The OSD format may support an element called OS that allows different implementations for different OS's. The system 10c may support this tag and accept implementations with no OS on any supported platform or may attempt to respect OS tags that restrict platforms. This enables applications that require platform specific support like transactions to restrict installations to those platforms that support the desired features. For example, applications that have transactional semantics might require Windows 2000 with an element like the following:

<OS-VALUE="Win2000">

If applications also provide a version of the application that doesn't require transactions, a second implementation may contain the elements:

<OS VALUE="Win9x">

<OS VALUE="WinNT">

An exemplary manifest may include the following:

```
<SOFTPKG NAME="com.microsoft.www.money" VERSION=
"1,0,0,0">
    <TITLE>Microsoft Money</TITLE>
    <ABSTRACT>Microsoft Money for Exampleweb</ABSTRACT>
    <LICENSE HREF=
    "http://www.microsoft.com/money/license.html" />
    <IMPLEMENTATION>
        <CODEBASE
            HREF="http://www.microsoft.com./money/money.cab" />
    </IMPLEMENTATION>
</SOFTPKG>
```

It is to be appreciated that there are several other optional elements that may be employed to provide information to a potential consumer of the application. For example, OSD may have a DISKSPACE element that details how much disk storage is required to contain the (unpacked) application.

The following Attributes may be extensions to the OSD format supported by the system 10c.

| Element | Description |
| --- | --- |
| SOFTPKG | top level OSD element |
| IMPLEMENTATION | OSD implementation element |
| CODEBASE | indicates the application CAB file |
| TITLE | Application friendly name |
| VERSION | Application version |
| ABSTRACT | Description/abstract for the application |
| LICENSE | License URL. |
| SIZE | Good faith estimate on how much disk space the application consumes when expanded. |
| AUTHOR | The author of the application. |
| SOURCE | The source of the application. This can be blank, or can be used to provide more information (e.g. site). |
| HELPURL | Local or remote URL that provides help on the application. |
| ICONURL | Local (exampleweb:) URL that provides the image for the application to the admin UI. |
| REMOTEICONURL | Remote (http:) URL that provides the image for the application during the installation process. |
| REMOTEHELPURL | The canonical remote URL for the application (e.g. the remote application homepage). This is used as the starting point for finding updates, etc. |
| CUSTOMURL | Zero or more custom URL's that will be shown by the adminUI. This can be used to advertise alternate entry points into an application. This supports two attributes: HREF and DESCRIPTION. E.g. <customurl href="exampleweb://www.foo.com/myplace" description="Somewhere Cool in my App" /> |
| ONINSTALLURL | Optional URL that will be navigated to after an application install is done. |
| ONUPDATEURL | Optional URL that will be navigated to after an application update is done. |
| HOMEPAGE | Default URL to be used for the local application. This is useful for when an application is installed by following a link to somewhere other than its main page. |

Downloaded applications may run with code access permissions (not shown) granted by policy on the local machine for the remote domain. When local applications are installed, they may be granted permissions based on the URI provided for them at installation time which may be local and/or remote, depending on the user's desire. The system 10c may add policy to the application domain to indicate that any code loaded from the application directory hierarchy is associated with the domain of origin for the application. For example, consider an application downloaded and installed from www.foo.com/myapp. When system 10c loads the code from that application, it provides evidence to the security system that indicates that the code is from www-.foo.com/myapp, therefore permissions for that domain may apply. In addition, the system 10c may add policy in order that code loaded from the application directory (and children directories) may be associated with the remote URI: www-.foo.com/myapp. This mitigates enabling the application to load assemblies from its own directory and thus bypassing domain security. The system may also add policy to indicate that network input/output is to be enabled to the remote host of origin (in the above example, www.foo.com).

An administrative UI may also be implemented when the system 10c is installed. For example, a toolbar button may be added to the browser 60 toolbar (not shown). When the button is clicked, it may navigate to exampleweb://Home, for example, which may invoke the administrative UI. User navigation to exampleweb:// or exampleweb://Home may also run the administrative UI. The administrative UI may consist of the following exemplary pages:

Home Page: this page may list installed applications and provides a way to easily remove them. In addition, it may provide links to install new applications from a local or remote source.

Install Page: If this page is presented with a remote URI, it may present the user with information about the application from the manifest and enable them to install the application. If this page is not presented with a remote URI, it may prompt for one.

Local Install page: This page enables users to install a local application, specifying a local directory and the local URI to utilize for the application.

Delete Confirmation Page: This page may prompt users for confirmation before deleting a page. If confirmation is given, it may remove the application.

Update Page: This page notifies users that a newer version of the application is available and asks to retrieve it. If approval is granted, the newer version is downloaded and installed. If the application has an update page, this page should redirect to it after a successful update.

Figure 4:
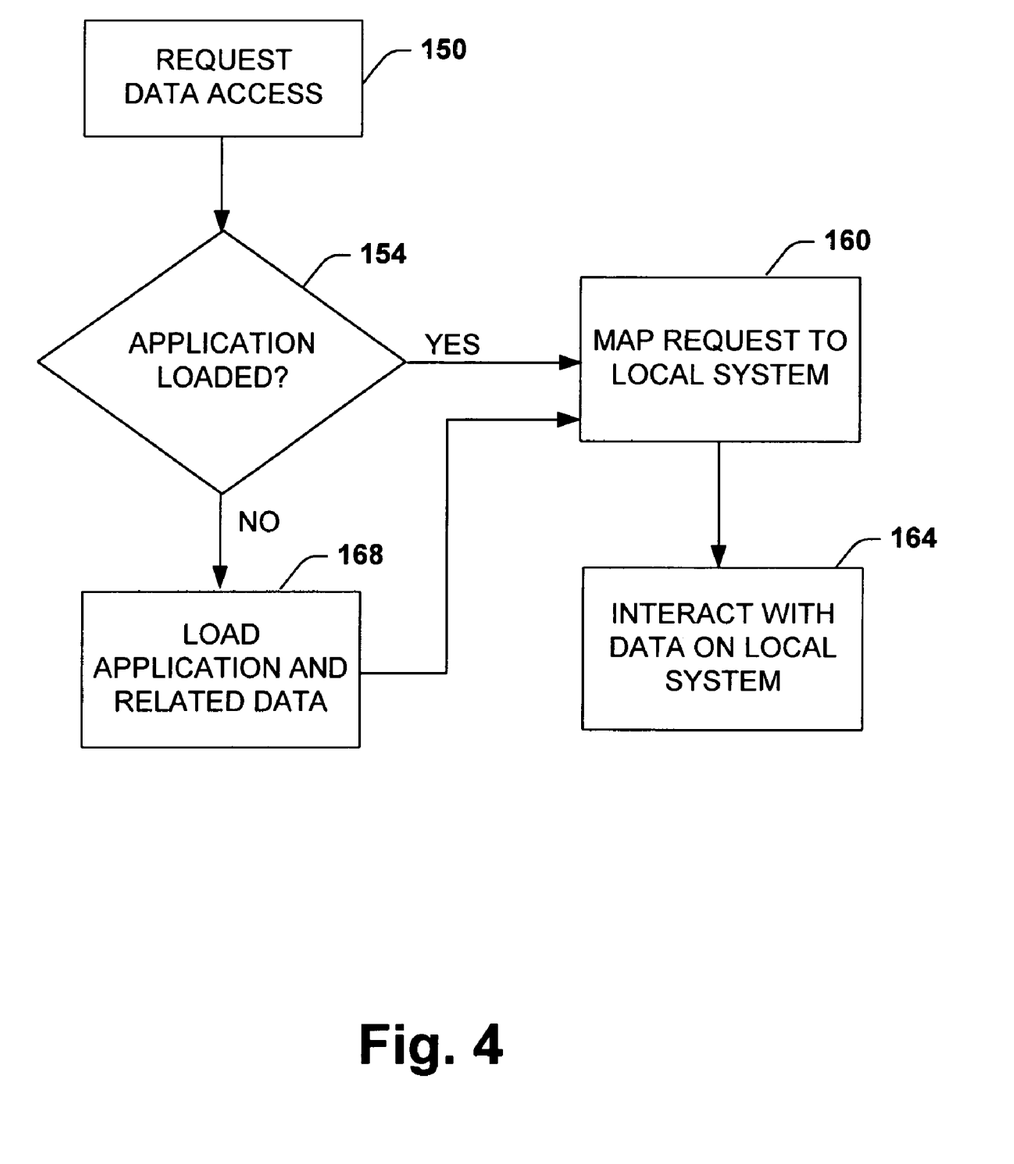
FIG. 4 is a flow chart diagram illustrating a methodology for providing a multi-tier architecture in accordance with an aspect of the present invention.

Referring now to FIG. 4, a flow chart diagram illustrates a methodology in accordance with the present invention. At step 150, a user initiates a local data request. At step 154, a determination is made as to whether an application has been loaded on the local system for operating on the request of step 150. If an application has been previously loaded, the methodology proceeds to step 160 and maps the request to the local system as described above. After the request has been mapped, the user may interact with the data (e.g., web page) on the local system at step 164. If the application for providing the requested services has not been loaded at step 154, the process proceeds to step 168. At step 168, the application for serving the data request is loaded on the local system. As described above, the application may be downloaded from the remote system and/or loaded locally from a CD and/or other storage medium. After the application has been loaded at step 168, the process proceeds to step 160 and proceeds to map the request to the local system.

Figure 5:
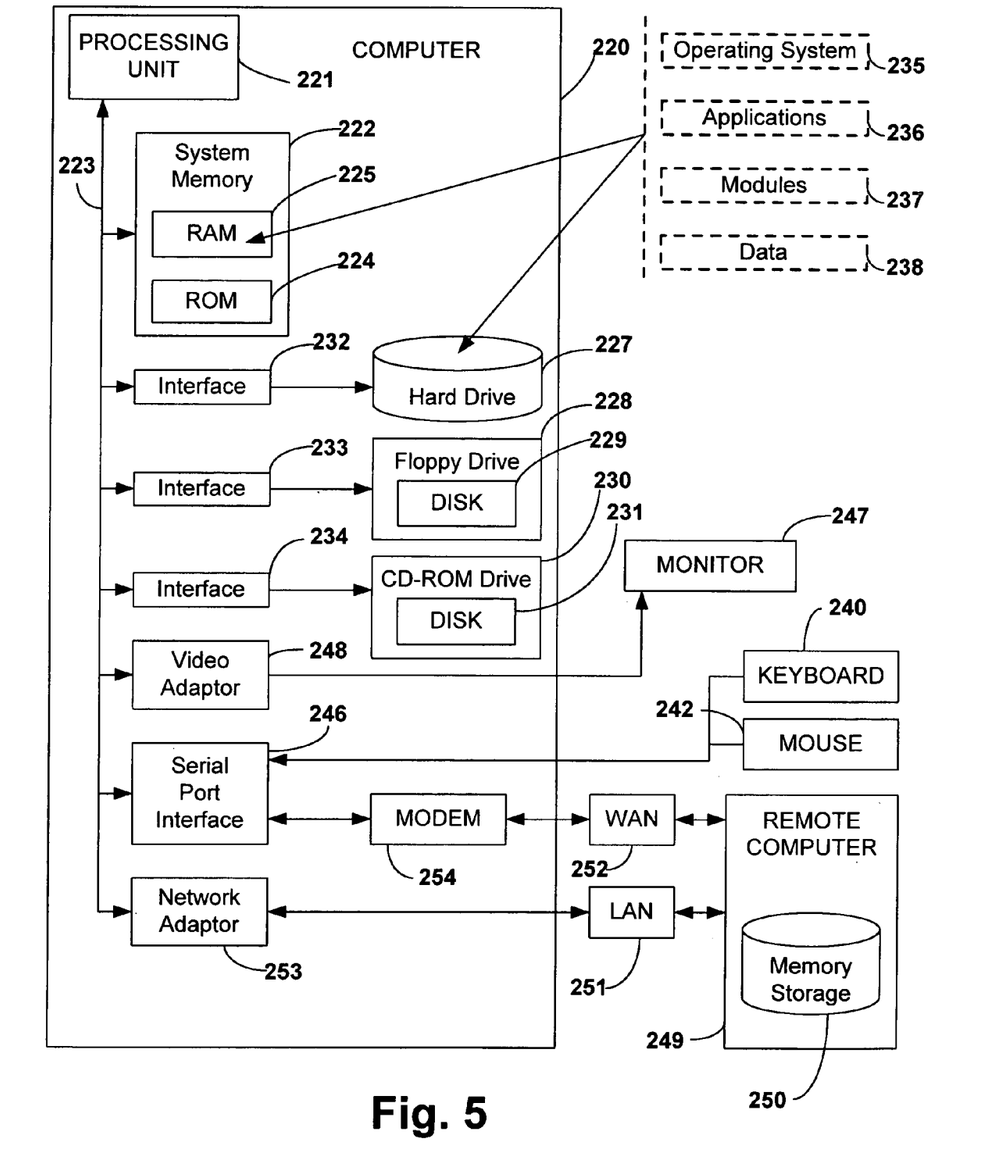
FIG. 5 is a schematic block diagram illustrating a system in accordance with an aspect of the present invention.

In order to provide a context for the various aspects of the invention, FIG. 5 and the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 5, an exemplary system for implementing the various aspects of the invention includes a conventional computer 220, including a processing unit 221, a system memory 222, and a system bus 223 that couples various system components including the system memory to the processing unit 221. The processing unit may be any of various commercially available processors, including but not limited to Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also may be employed as the processing unit 221.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 224 and random access memory (RAM) 225. A basic input/output system (BIOS), containing the basic routines that help to transfer information between elements within the server computer 220, such as during start-up, is stored in ROM 224.

The computer 220 further includes a hard disk drive 227, a magnetic disk drive 228, e.g., to read from or write to a removable disk 229, and an optical disk drive 230, e.g., for reading a CD-ROM disk 231 or to read from or write to other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide nonvolatile storage of data, data structures, computer-executable instructions, etc. for the server computer 220. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 225, including an operating system 235, one or more application programs 236, other program modules 237, and program data 238. The operating system 235 in the illustrated computer may be a Microsoft operating system (e.g., Windows NT operating system). It is to be appreciated that other operating systems may be employed such as UNIX, for example.

A user may enter commands and information into the server computer 220 through a keyboard 240 and a pointing device, such as a mouse 242. Other input devices (not shown) may include a microphone, a joystick, a game pad, a satellite dish, a scanner, or the like. These and other input devices are often connected to the processing unit 221 through a serial port interface 246 that is coupled to the system bus, but may be connected by other interfaces, such as a parallel port, a game port or a universal serial bus (USB). A monitor 247 or other type of display device is also connected to the system bus 223 via an interface, such as a video adapter 248. In addition to the monitor, computers typically include other peripheral output devices (not shown), such as speakers and printers.

The computer 220 may operate in a networked environment using logical connections to one or more remote computers, such as a remote client computer 249. The remote computer 249 may be a workstation, a server computer, a router, a peer device or other common network node, and typically includes many or all of the elements described relative to the server computer 220, although only a memory storage device 250 is illustrated in FIG. 5. The logical connections depicted in FIG. 5 may include a local area network (LAN) 251 and a wide area network (WAN) 252. Such networking environments are commonplace in offices, enterprise-wide computer networks, intranets and the Internet.

When employed in a LAN networking environment, the server computer 220 may be connected to the local network 251 through a network interface or adapter 253. When utilized in a WAN networking environment, the server computer 220 generally may include a modem 254, and/or is connected to a communications server on the LAN, and/or has other means for establishing communications over the wide area network 252, such as the Internet. The modem 254, which may be internal or external, may be connected to the system bus 223 via the serial port interface 246. In a networked environment, program modules depicted relative to the computer 220, or portions thereof, may be stored in the remote memory storage device. It will be appreciated that the network connections shown are exemplary and other means of establishing a communications link between the computers may be employed.

In accordance with the practices of persons skilled in the art of computer programming, the present invention has been described with reference to acts and symbolic representations of operations that are performed by a computer, such as the computer 220, unless otherwise indicated. Such acts and operations are sometimes referred to as being computer-executed. It will be appreciated that the acts and symbolically represented operations include the manipulation by the processing unit 221 of electrical signals representing data bits which causes a resulting transformation or reduction of the electrical signal representation, and the maintenance of data bits at memory locations in the memory system (including the system memory 222, hard drive 227, floppy disks 229, and CD-ROM 231) to thereby reconfigure or otherwise alter the computer system's operation, as well as other processing of signals. The memory locations wherein such data bits are maintained are physical locations that have particular electrical, magnetic, or optical properties corresponding to the data bits.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

The invention claimed is:

1. A system that executes a network-based application, comprising
   a first component that receives and maps a local request that is serviced by relevant portions of application logic stored on a local portable storage medium and a server, the relevant portions on the server comprising a mobile logic portion;
   a second component that identifies the relevant portions of the application logic and downloads the relevant portions from the local portable storage medium and server to the client to service the local request;
   a third component that grants access permission to the downloaded relevant portions based on a policy residing on the client, the access permission is at least one of a local and a remote permission that facilitates ensuring the downloaded portions are secure; and
   the execution of the relevant portions of the application is interchangeably processed by the server and the client without modification to the relevant portions.

2. The system of claim 1, core application functionality is preserved between the client and the server.

3. The system of claim 1, the local storage medium comprises a CD or floppy disk.

4. The system of claim 1, the first component comprises unguarded logic for lower security systems.

5. The system of claim 1, remote data is downloaded from the server to the client based upon a remote data request.

6. The system of claim 5, the remote data request is an HTTP request.

7. The system of claim 5, the remote data is processed locally on the client via local data requests directed at the application logic.

8. The system of claim 5, the remote data is provided by at least one of an XML and WML response.

9. The system of claim 5, the remote data is communicated via at least one of the Internet, Intranet, or wireless networks.

10. An architecture for processing networked-based applications, comprising:
    a presentation tier for interacting with a networked-based application at a client that is loaded via local portable storage and a server;
    a security system that checks the networked-based application residing on the client for an access permission;
    a mobile tier operatively coupled to the presentation tier, the mobile tier provides for execution of at least a portion of the networked-based application that is mapped to local requests at the client end and is associated with a local permission; and
    a guarded tier operatively coupled to at least one of the mobile tier and presentation tier, the guarded tier provides for execution of remaining portions of the network-based application that are associated with a remote permission at the server.

11. The architecture of claim 10, further including a data tier operatively coupled to the guarded tier, the data tier including data employed in connection with executing the network-based application.

12. The architecture of claim 10, the guarded tier includes logic for enabling the mobile tier to execute the network-based application.

13. The architecture of claim 11, the presentation tier generates local requests to the mobile tier to manipulate data provided by the data tier.

14. The architecture of claim 13, the mobile tier executes applications logic associated with the guarded tier to manipulate data provided by the data tier.

15. The architecture of claim 14, the mobile tier processes local data requests offline and generates remote requests to the guarded tier to at least one of transmit and receive data associated with the data tier based upon the offline local requests.

16. A computer-readable medium having computer-executable instructions for providing the architecture of claim 15.

17. A system for processing networked-based applications, comprising:
    means for interacting with a networked-based application residing at a client that is loaded via a local portable storage means and a server;
    means for determining a domain permission associated with the networked-based application; and
    means for downloading, identifying and executing at least a portion of the networked-based application with domain permission at the client end in connection with locally mapped requests and at the server in connection with remote requests, wherein the requests are generated by the client.

18. The system of claim 17, further comprising means for supplying remote data employed in connection with executing local data requests associated with the network-based application.

19. The system of claim 18, further comprising means for requesting the local data requests offline and generating remote requests to at least one of transmit and receive data associated with the remote data based upon the offline local requests.

20. A method for executing a network-based application, comprising:
    downloading and executing at least a portion of a network-based application that is mapped and identified to a local request on a client computer, the at least a portion of the network-based application is associated with a local or remote permission and comprises application and presentation logic loaded from portable local memory and a server, and
    executing at least a portion of network-based application which is interchangeably processed by the server or the client without modification to the portion.

21. A method that facilitates client-side computing, comprising:
    transmitting a request for portions of an application associated with a transaction;
    mapping the request for portions of the application to a local portable and a server storage medium;
    identifying respective portions of the application on the local portable and the server storage medium;
    downloading respective portions of the application from the local portable and the server remote storage medium;
    loading the portions of the application on a client;
    verifying the loaded portions of the application are the portions of application retrieved from the local portable and the server storage medium based on a policy residing on the client; and
    executing the portions of the application in connection with the transaction.

22. The method of claim 21, further comprising mapping the retrieved portions of application to the request.

23. The method of claim 21, further comprising commencing execution of the transaction and associated portions of application on the client while off-line and completing the transaction after re-connecting on-line.

24. A method that facilitates servicing a client request, comprising:
    receiving a first request from a client for a first portion of an application that is stored on local and a client removable storage medium;
    mapping the first request from the client for the first portion of the application to the local and the client removable storage medium;
    identifying and downloading the first portion of application to the client from the local and the client removable storage medium; and
    receiving a second request from the client to execute a second portion of the application at the server to complete servicing the client request, wherein the request is satisfied by both the client and the server that are servicing respective secure portions of the request.

* * * * *

UNITED STATES PATENT AND TRADEMARK OFFICE
CERTIFICATE OF CORRECTION

PATENT NO. : 6,996,599 B1  
APPLICATION NO. : 09/666246  
DATED : February 7, 2006  
INVENTOR(S) : Mark T. Anders et al.

Page 1 of 1

It is certified that error appears in the above-identified patent and that said Letters Patent is hereby corrected as shown below:

On the title page, in item (56), under "Other Publications", in column 2, line 3, delete "System" and insert -- Systems --, therefor.

On page 2, in item (56), under "Other Publications", in column 2, line 6, delete "Phomozilla" and insert -- Protozilla --, therefor.

In column 6, line 61, delete "www microsoft" and insert -- www.microsoft --, therefor.

In column 8, line 38, delete "-000-" and insert -- -0000- --, therefor.

In column 9, line 59, delete "OS-VALUE" and insert -- OS VALUE --, therefor.

In column 14, line 14, in Claim 1, after "comprising" insert -- : --.

In column 16, line 3, in Claim 20, delete "server," and insert -- server; --, therefor.

In column 16, line 16, in Claim 21, after "server" delete "remote".

Signed and Sealed this

Fifteenth Day of September, 2009

David J. Kappos  
*Director of the United States Patent and Trademark Office*